United States Patent
Yang

(10) Patent No.: US 6,666,620 B2
(45) Date of Patent: Dec. 23, 2003

(54) WAVE DISSIPATING BLOCK FOR COVERING A BREAKWATER

(76) Inventor: Won-Hoi Yang, Ma-1106, Bangbae Samho-Apt. 725, Bangbae-dong, Seochu-gu, Seoul (KR)

( * ) Notice: Subject to any disclaimer, the term of this patent is extended or adjusted under 35 U.S.C. 154(b) by 0 days.

(21) Appl. No.: 10/046,799

(22) Filed: Jan. 15, 2002

(65) Prior Publication Data

US 2002/0114669 A1 Aug. 22, 2002

(30) Foreign Application Priority Data

Jan. 17, 2001 (KR) .................................. 20-2001-1263

(51) Int. Cl.[7] .............................. E02B 3/12; E02B 3/06
(52) U.S. Cl. .......................................... 405/29; 405/16
(58) Field of Search .............................. 405/16, 17, 19, 405/20, 29, 21, 33

(56) References Cited

U.S. PATENT DOCUMENTS

| 4,767,235 A | * | 8/1988 | Caradonna et al. | ........... 405/33 |
| 5,620,280 A | * | 4/1997 | Melby et al. | ................. 405/29 |

FOREIGN PATENT DOCUMENTS

JP          406235210 A   *   8/1994   .................. 405/21

* cited by examiner

*Primary Examiner*—Heather Shackelford
*Assistant Examiner*—Lisa M. Saldano
(74) *Attorney, Agent, or Firm*—Howard & Howard

(57) ABSTRACT

A wave dissipating concrete block for covering an inclined surface facing seaside on a breakwater for the purpose of dissipating waves. The concrete block of the present invention includes a cylindrical body, tapered lump legs projecting from the cylindrical body and branch legs cylindrically projected through a circular base disposed on the cylindrical body. Projections are disposed on the branch legs and extend parallel or perpendicular to the cylindrical body.

10 Claims, 2 Drawing Sheets

WAVE DISSIPATING BLOCK FOR COVERING A BREAKWATER

CROSS-REFERENCE TO RELATED APPLICATIONS

This application claims the benefit of Korean Patent Application No. 2001-1263, filed Jan. 17, 2001.

FIELD OF THE INVENTION

The present invention relates to a block assembly and, more particularly, to a block assembly for constructing a breakwater and dissipating waves.

BACKGROUND OF THE INVENTION

Generally, a breakwater is a barrier, such as a seawall, for providing protection to a structure attached thereto, such as a shore, harbor or ship, from the force of waves washing thereupon. There are various classifications of breakwaters used for different applications depending on the wave properties and wave height, such as an upright breakwater, a composite breakwater, and a sloping-faced breakwater. Typically, breakwaters are formed from natural stones and pebbles having a uniform size. However, by absorbing the full impact and force of the waves, the breakwater may suffer erosion, damage or collapse over time. In addition, gathering and using natural stones causes environmental damage. Thus, artificial blocks having concave and convex surfaces are used to cover the breakwater and protect it from damage and to decrease wave power by breaking, reflecting and dissipating waves.

In the prior art, a Korean Patent Application No. 99-9345 by Yang entitled "Multi-leg Wave Dissipating Block for Covering Breakwater", teaches and discloses a wave dissipating block for use with a breakwater. The block includes a cylindrical body having lump columns and branch columns disposed thereon and being perpendicularly and radially projected therefrom. However, the branch columns are disposed so as to be narrowly spaced from each other and project perpendicularly from the cylindrical body, thereby causing the wave dissipation to be limited.

The present invention is aimed at solving one or more of the problems described above.

SUMMARY OF THE INVENTION AND ADVANTAGES

The purpose of the present invention is to solve one or more of the problems described above and to maximize wave dissipating effect regardless of wave status.

In one aspect of the invention, a wave dissipating block assembly for covering a sea-facing surface of a breakwater includes a cylindrical body, lump legs each having a longitudinally tapered surface and perpendicularly and radially projecting therefrom as a couple, at a designated distance from each other and at an angle, between each couple, branch legs formed as a couple, being disposed on the cylindrical body and perpendicularly and radially projecting therefrom, with each of the branch legs having a first diameter, circular bases perpendicularly disposed on the cylindrical body with the branch legs cylindrically and concentrically projecting therefrom and disposed on the circular base with each circular base having a second diameter.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to the Figures, wherein like numerals indicate like or corresponding parts throughout the several views, a wave dissipating block assembly for covering a sea-facing surface of a breakwater is generally shown at 10.

Figure 1:
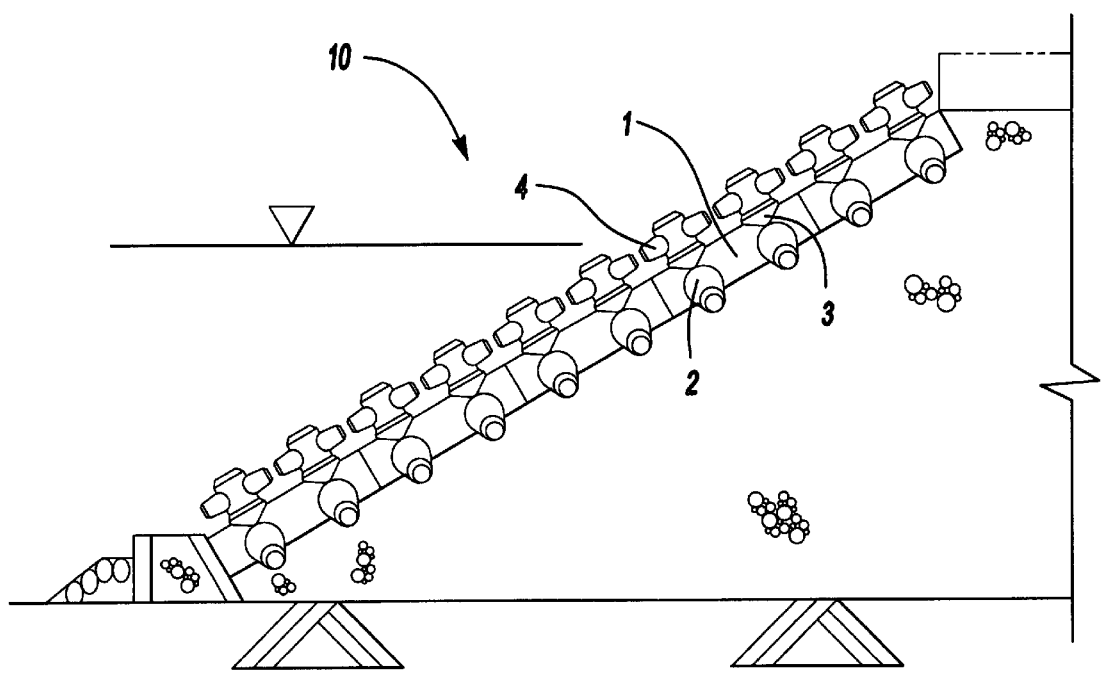
FIG. 1 is an elevational view of a breakwater covered by wave dissipating blocks on the inclined surfaces thereof, according to an embodiment of the present invention.
Figure 2:
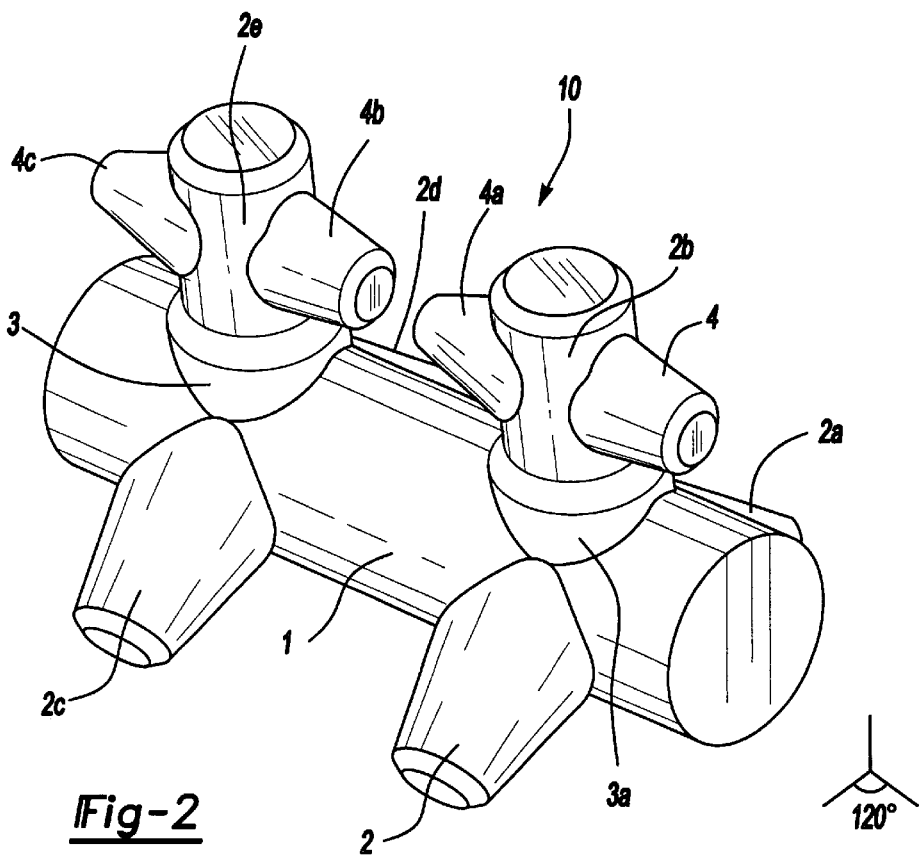
FIG. 2 is a perspective view of the wave dissipating block of FIG. 1, according to an embodiment of the present invention.
Figure 3:
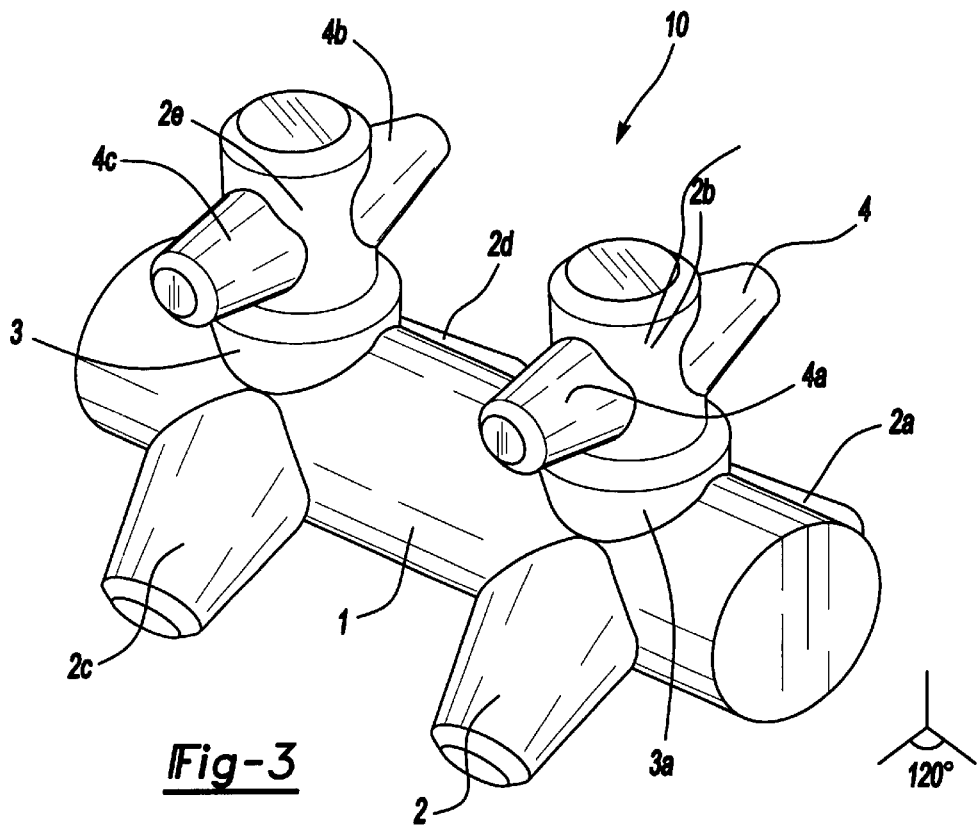
FIG. 3 is a perspective view of the wave dissipating block of FIG. 1, according to an embodiment of the present invention.
Figure 4:
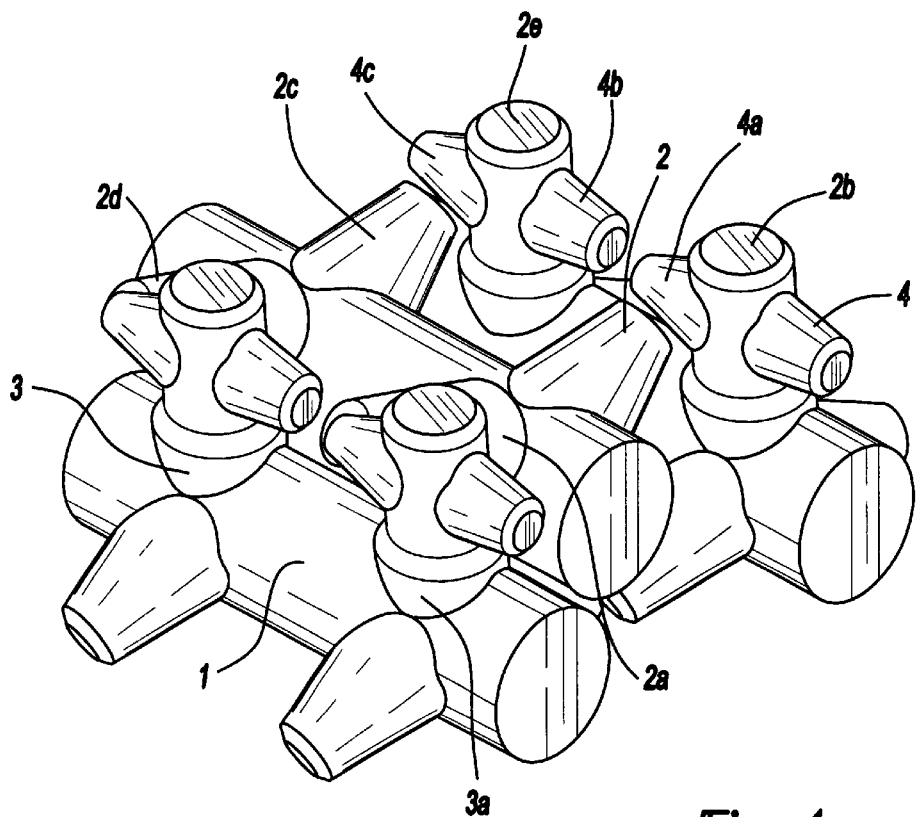
FIG. 4 is a perspective view illustrating assembly of adjacent wave dissipating blocks.

The assembly 10 comprises a cylindrical body 1 made out of concrete or any other suitable material, lump legs 2, 2a, 2c, 2d each having a longitudinally tapered surface and perpendicularly and radially projecting therefrom as first and second couples or pairs, such as 2,2c and 2a,2d, at a designated distance from each other and at an angle, such as a one hundred twenty degree angle between each couple, as shown in FIGS. 2 and 3. The assembly 10 further includes first and second branch legs 2b, 2e formed as a couple or pair, being disposed on the cylindrical body 1 and perpendicularly and radially projecting therefrom with each of the branch legs 2b, 2e having a first diameter. The assembly 10 further yet includes circular bases 3, 3a perpendicularly disposed on the cylindrical body 1 with the branch legs 2b, 2e cylindrically and concentrically projecting therefrom and disposed on the circular base 3, 3a, with each circular base 3, 3a having a second diameter. In one embodiment, the first diameter of each of the branch legs is less that the second diameter of each of the circular bases. The assembly 10 still further includes first, second, third, and fourth tapered projections 4, 4a, 4b, 4c projecting outwardly from the branch legs 2b, 2e and, in general, extending parallel to the cylindrical body 1.

Each of the lump legs 2, 2a, 2c, 2d includes a tapered surface which is narrower at one end, as shown in FIG. 2. Each of the branch legs 2b, 2e are cylindrically shaped and the outwardly tapered projections 4, 4a, 4b, 4c narrowed on each end may be projected therefrom, parallel to the cylindrical body 1 as in FIG. 2 or perpendicular to the cylindrical body 1 as in FIG. 3.

The shape and structure of the legs and projections in the block assembly of the present invention contribute to wave dissipation by impacting, dispersing and reflecting waves to the legs and projections.

In the present invention, there are spaces defined between the lump legs 2 and 2c and also between the lump legs 2a and 2d, which may be filled by the branch leg 2b with projections 4, 4a or branch leg 2e with projections 4b, 4c of another wave dissipating block assembly for assembling, distributing or loading the blocks in the surface of the breakwater.

According to the present invention, when arranging the wave dissipating blocks for covering the sea-facing surface of the breakwater, it may be possible to selectively arrange the blocks on the breakwater longitudinally or transversely according to topographical location and conditions of the breakwater, which improves wave dissipating effect for straight wave or reflective wave, and also improves wave dissipating effects by increasing surface contact area to waves because of the legs 2, 2a, 2c, 2d, 2b, 2e, projections 4, 4a, 4b, 4c, and circular bases 3, 3a formed on the cylindrical body.

Obviously, may modifications and variations of the present invention are possible in light of the above teachings. The invention may be practiced otherwise than as specifically described within the scope of the appended claims.

What is claimed is:

1. A wave dissipating block assembly for covering a sea-facing surface of a breakwater, comprising:

a body;

first and second pairs of lump legs disposed on said body and perpendicularly and radially projecting therefrom at an angle relative to one another;

first and second branch legs disposed on said body and perpendicularly and radially projecting therefrom with each of said branch legs having a first diameter; and a projection perpendicularly disposed on said first branch leg and having an outer surrounding surface being tapered and projecting from said first branch leg.

2. An assembly as set forth in claim 1 wherein said angle is one hundred twenty degrees.

3. An assembly as set forth in claim 1 including an adjacent wave dissipating block disposed on said assembly having a leg disposed thereon with said leg juxtaposed between said lump legs of said assembly.

4. An assembly as set forth in claim 1 wherein said assembly is concrete.

5. An assembly as set forth in claim 1 wherein said body is cylindrical and said projection extends perpendicularly to said cylindrical body.

6. An assembly as set forth in claim 1 wherein said body is cylindrical and said projection extends parallel to said cylindrical body.

7. A wave dissipating block assembly for covering a sea-facing surface of a breakwater, comprising:

a body;

first and second pairs of lump legs disposed on said body and perpendicularly and radially projecting therefrom at an angle relative to one another; first and second branch legs disposed on said body and perpendicularly and radially projecting therefrom with each of said branch legs having a first diameter;

a projection perpendicularly disposed on said first branch leg; and a circular base having a second diameter perpendicularly disposed on said body at each of said branch legs wherein said first diameter of each of said branch legs is less than said second diameter of said circular base.

8. A wave dissipating block assembly for covering a sea-facing surface of a breakwater, comprising:

a body;

first and second pairs of lump legs disposed on said body and perpendicularly and radially projecting therefrom at an angle relative to one another;

first and second branch legs disposed on said body and perpendicularly and radially projecting therefrom with each of said branch legs having a first diameter; and a projection perpendicularly disposed on said first branch leg wherein said body is cylindrical and said projection has an outer surrounding surface being tapered perpendicularly projecting from said first branch leg and extending parallel to said cylindrical body.

9. A wave dissipating block assembly for covering a sea-facing surface of a breakwater, comprising:

a body;

first and second pairs of lump legs disposed on said body and perpendicularly and radially projecting therefrom at an angle relative to one another;

first and second branch legs disposed on said body and perpendicularly and radially projecting therefrom with each of said branch legs having a first diameter;

a projection perpendicularly disposed on said first branch leg; and a second projection perpendicularly disposed on said first branch leg.

10. A wave dissipating block assembly for covering a sea-facing surface of a breakwater, comprising:

a body;

first and second pairs of lump legs disposed on said body and perpendicularly and radially projecting therefrom at an angle relative to one another;

first and second branch legs disposed on said body and perpendicularly and radially projecting therefrom with each of said branch legs having a first diameter;

a projection perpendicularly disposed on said first branch leg;

a second projection perpendicularly disposed on said first branch leg; and third and fourth projections perpendicularly disposed on said second branch leg.

* * * * *